United States Patent
Hartl

(10) Patent No.: US 8,514,184 B2
(45) Date of Patent: Aug. 20, 2013

(54) OPERATING ELEMENT AND METHOD OF INPUTTING VALUES INTO A MEDICAL APPARATUS

(75) Inventor: Stefan Hartl, Gland (CH)

(73) Assignee: Ferton Holding S.A. (CH)

( * ) Notice: Subject to any disclaimer, the term of this patent is extended or adjusted under 35 U.S.C. 154(b) by 750 days.

(21) Appl. No.: 11/833,499

(22) Filed: Aug. 3, 2007

(65) Prior Publication Data

US 2008/0036744 A1  Feb. 14, 2008

(30) Foreign Application Priority Data

Aug. 10, 2006 (DE) .......................... 10 2006 037 545

(51) Int. Cl.
*G06F 3/041* (2006.01)

(52) U.S. Cl.
USPC .......................................... 345/173; 345/156

(58) Field of Classification Search
USPC ................................................ 345/173, 156
See application file for complete search history.

(56) References Cited

U.S. PATENT DOCUMENTS

| | | | |
|---|---|---|---|
| 6,424,338 B1 * | 7/2002 | Anderson | 345/173 |
| 6,504,530 B1 * | 1/2003 | Wilson et al. | 345/173 |
| 7,077,853 B2 | 7/2006 | Kramer et al. | |
| 7,136,051 B2 | 11/2006 | Hein et al. | |
| 7,321,361 B2 * | 1/2008 | Sato et al. | 345/173 |
| 7,466,307 B2 * | 12/2008 | Trent et al. | 345/173 |
| 7,498,532 B2 | 3/2009 | Kuhner et al. | |
| 7,683,891 B2 * | 3/2010 | Tran | 345/173 |
| 7,714,846 B1 * | 5/2010 | Gray | 345/173 |
| 2002/0030667 A1 * | 3/2002 | Hinckley et al. | 345/173 |
| 2004/0251402 A1 * | 12/2004 | Reime | 250/221 |
| 2005/0052429 A1 | 3/2005 | Philipp | |
| 2005/0134485 A1 | 6/2005 | Hein et al. | |
| 2005/0134559 A1 | 6/2005 | Hein et al. | |

FOREIGN PATENT DOCUMENTS

| | | |
|---|---|---|
| DE | 101 33 135 | 1/2003 |
| DE | 103 13 401 | 10/2004 |
| DE | 601 02 341 | 2/2005 |
| DE | 103 51 199 | 6/2005 |
| DE | 10 2004 052 240 | 7/2005 |
| DE | 10 2004 024 835 | 10/2005 |
| DE | 10 2005 002 952 | 7/2006 |
| DE | 21 2004 000 044 | 7/2006 |
| WO | 2006/076972 | 7/2006 |

OTHER PUBLICATIONS

German Office Action issued Sep. 23, 2009 in connection with corresponding German Patent Application No. 10 2006 037545.9.
German Office Action issued Jul. 24, 2007 in connection with corresponding German Patent Application No. 10 2006 037545.9.

* cited by examiner

*Primary Examiner* — Viet Pham
(74) *Attorney, Agent, or Firm* — Ostrolenk Faber LLP

(57) ABSTRACT

The present invention relates to an operating element and a method of inputting values into a medical apparatus (1), having a touch-sensitive sensor (19) and an operating surface (22), the sensor (19) being mounted below a cover (20) forming the operating surface (22), which detects the presence or absence of an operating means (11) and generates a contact value (17). A display (14) of the operating element shows a current value (16), which is variable by means of the contact value (17) of the sensor (19) to a value (15) to be set. Advantageously, the current value (16) can be varied by means of contact of the operating surface (22) to any point or to a point which corresponds to the value (15) to be set, respectively depending on the manner of contact of the operating surface (22).

11 Claims, 2 Drawing Sheets

OPERATING ELEMENT AND METHOD OF INPUTTING VALUES INTO A MEDICAL APPARATUS

Figure 1:
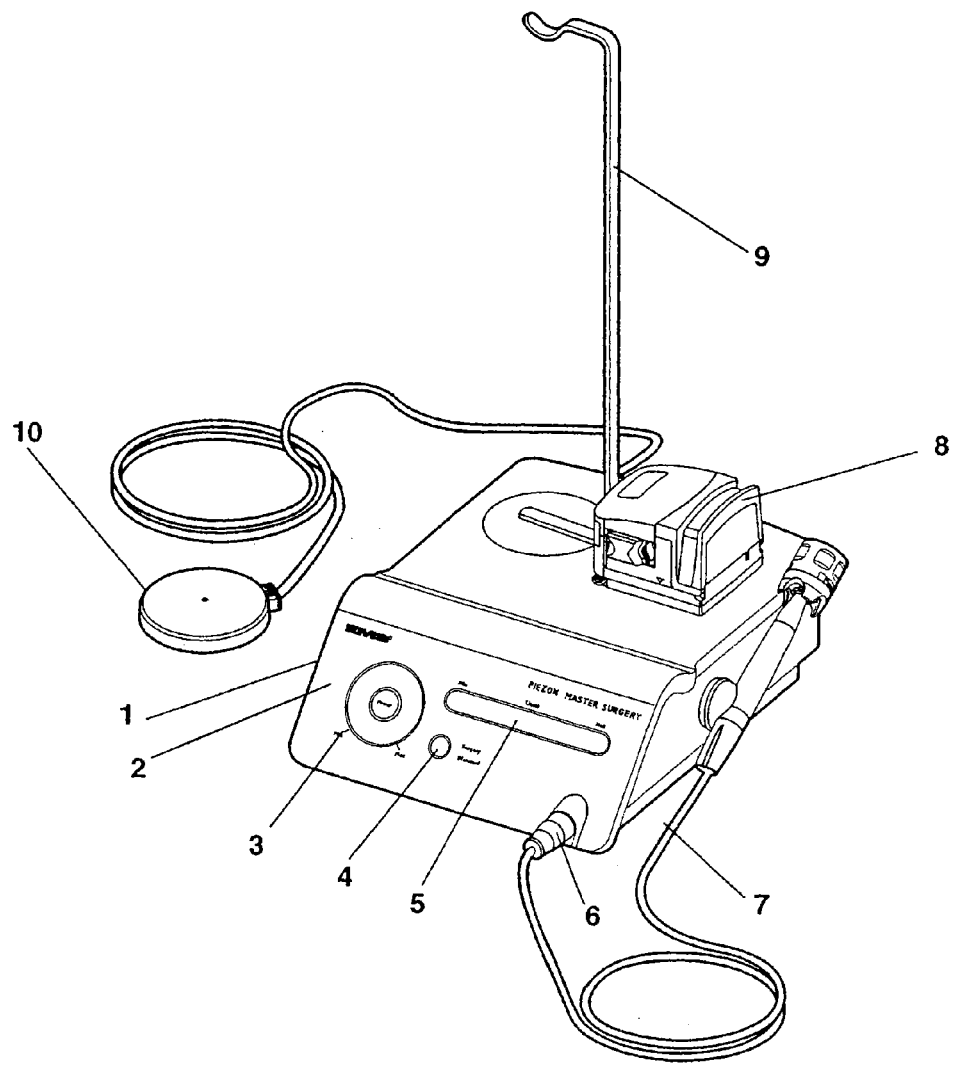

The present invention relates to an operating element and a method of inputting values into a medical apparatus. Furthermore, the invention relates to a medical apparatus which is equipped with such an operating element and with the aid of which the method according to the invention can be carried out.

In the prior art, it is known to input values and parameters into medical apparatuses such as injection apparatus, surgical apparatus, breathing apparatus or in dental apparatus by means of levers, pushbuttons or rotary knobs in order for example to control the supply of medicaments or breathing air or to control the speed of a drill. A disadvantage of these operating elements is that dirt and bacteria collect at the border faces between the operating elements, such as pushbuttons or switches and the surface of the medical apparatus, which makes it difficult to effect reliable cleaning and disinfecting of these surfaces or considerably restricts such cleaning operations.

Furthermore, with conventional switches, levers, pushbuttons or rotary knobs, only individual functions of the medical apparatus can be activated, i.e. for example one can set the speed of rotation of a drill by means of a corresponding rotary knob, but not the simultaneous supply of coolant fluid.

A further disadvantage of the conventional operating elements is that adjustment of the current value only takes place linearly and in order to change a current value the doctor first has to grasp the appropriate lever or rotary knob of the operating element at exactly the point at which the current value is located in order to move or rotate the lever or knob to the point at which the value to be set is located and which is desired by the doctor. The doctor will therefore be distracted from his actual task, i.e. for example during a surgical intervention or dental operation, in order to operate the medical apparatus.

Finally, conventional operating elements are often difficult to read and there is a risk that short-circuits in the apparatus may be transferred by the operating elements coupled to the interior of the apparatus to the operator and may possibly cause injury.

Furthermore, it is known from the prior art to provide touch-sensitive ("touch-sensitive" also includes those sensors which detect the presence or absence of an operating means over a specified distance, also through surfaces) sensors for inputting values in electric or electronic apparatuses, which by means of the capacitive detection of the finger position of an operator over a parameter panel generate a contact value, which forwards a specified value to be set to the apparatus, depending on the respective position of the finger on the operating panel (cf. various products by the firm Quantum Research Group: www.qprox.com).

The object of the present invention is to overcome the disadvantages described above of the prior art in the field of medicine, i.e. to indicate an operating element and a method of inputting values into a medical apparatus which is easy to clean and hygienic, permits simple, easy setting of the operating parameters, and which is multifunctional, allowing the same to generate different control signals by means of one operating element.

The invention achieves these objects by the characterising features of the independent claims. Advantageous embodiments are characterised and claimed in the subclaims.

According to the present invention, the operating element for inputting values into a medical apparatus has one or more touch-sensitive sensors, which are mounted under a cover forming an operating surface and which detect the presence or absence of an operating means or its position. According to the presence or absence and/or position of the operating means relative to the touch-sensitive sensor, by means of the sensor a contact value is generated which is used to change the current value of a specified function unit of the medical apparatus. In this case, the current value is indicated by a display of the operating element and by means of the contact value of the sensor is changed to a value to be set.

The advantage of the present invention is in particular that between the operating means and the sensor a cover may be mounted, which although permitting the sensor to detect the presence or absence or the position of the operating means, simultaneously however keeps dirt and bacteria away from the sensor, i.e. from the adjustment means, so that the operating interface of the medical apparatus can be easily cleaned and disinfected.

Furthermore, this embodiment of the operating element has the advantage that one and the same operating surface can be used for different function units of the medical apparatus, depending on which function unit the operating surface is allocated to. Thus, for example, it is possible to equip an elongate operating surface with a number of touch-sensitive sensors which are disposed along the operating surface and which detect the position of the finger of an operator, and according to the position of the detecting sensor relative to a minimum or maximum value, send a control signal for example to the motor of a dental drill, which then triggers a specified speed of rotation according to the sensor position. By contact of a switch-over sensor, the elongate operating surface can then be allocated to the pressure control of a coolant, so that renewed tapping of a specified sensor along the elongate operating surface triggers a specified pressure for the supply of coolant during drilling.

However, should the doctor wish to give up the option of switch-over, then before the start of drilling, he can touch a further switch-over sensor so that the elongate operating surface is allocated to both function units simultaneously, so that during the operation he then only has to tap or touch a certain point along the elongate operating surface and a specified drill speed and a specified pressure for the supply of coolant fluid is set simultaneously.

The cover forming the operating surface is so formed or mounted that it is not possible for moisture to be transferred from the operating means to the sensor. For example, the cover may be a thin plastics foil or a thin plastics cover which extends fully over the sensors on the operating side of a medical apparatus. This simplifies cleaning and sterilisation of the apparatus substantially.

Advantageously, the touch-sensitive sensor is in this case a capacitive sensor which is mounted under a cover forming the operating surface, such as for example a glass plate or a plastics coating, the operating means advantageously being a human finger. Furthermore, the operating surface may be both in the form of a dot and a line or a circle, according to which function unit of the medical apparatus is to be triggered. The display of the operating element in this case shows the current value also during setting continuously or discontinuously according to a particular embodiment of the present invention, in which case on or next to the operating surface, advantageously markings are also applied, which indicate the values to be set or the function unit to be operated. According to a preferred embodiment of the present invention, next to or between the sensors are located light-emitting diodes (LED), which according to the value set light up either individually or together, starting from a minimum value up to the current value. In order to set the value to be set, it suffices to place the operating means, such as for example a finger, in any position on the operating surface or to displace the same there. The manner of setting of the value to be set is explained more fully below with the aid of a description of the method according to the invention:

According to the method according to the invention for inputting values into a medical apparatus, a touch-sensitive sensor mounted below a cover forming an operating surface is activated in order to detect the presence or absence of an operating means or its position relative to the sensor and in order to generate a contact value. By means of this contact value, which is a measure of the position of the operating means, a current value is changed. This change is effected by means of different types of setting:

1. Absolute Setting

In the setting type of absolute setting, the contact value is generated by tapping in the value to be set on the operating surface and the current value is set immediately to the value to be set. It is therefore sufficient that the operator of the medical apparatus briefly taps the operating surface at precisely the position on which the current value is to be directly and immediately set.

2. Relative Setting

According to a second preferred setting type, the current value is varied continuously by touching the operating surface at any point in the direction of the contact value, until the current value has either reached the contact value or until the contact value is reset by the absence of the operating means. If the current value is for example close to the minimum value and if the finger of an operator is for example set close to the maximum value, thus the current value starts to change starting from the moment of contact and continuously in the direction of the contact value and also reaches this when the finger of the operator is not raised again from the operating surface. Otherwise, the current value remains at precisely the same point at which it is situated at the moment of raising of the operator's finger.

3. Dynamic Setting

According to a third preferred embodiment of the present invention, the current value is varied continuously by brushing the operating means over the operating surface in one control direction until the contact value is reset by the absence of the operating means. In this case, the user brushes his finger over the operating panel without noting beforehand at what position the current value is to be found exactly. The brushing over the operating panel is effected independently of the position of the finger at the start of brushing, so that the current value varies in the direction of the brushing finger until the finger is either lifted or remains at a certain position. In this case, the current value does not vary further, i.e. it does not change further in particular in the direction of the contact value generated, but remains stationary.

According to a modified embodiment of the dynamic setting, the rate of variation of the current value changes upon acceleration of the brushing movement of the operating means. The faster the user brushes over the operating surface with his finger, the more rapidly the current value changes in the control direction of the operating means (finger, stylus inter alia).

According to a further preferred embodiment of the present invention, the current value is displayed below or next to the operating surface continuously or step-wise by means of a display and is varied in particular independently of the position of the presence or absence of the operating means.

Figure 1A:
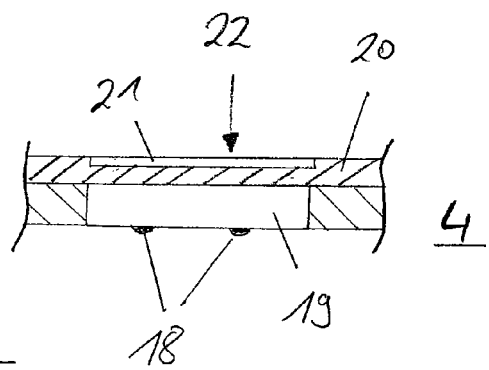
Figure 2:
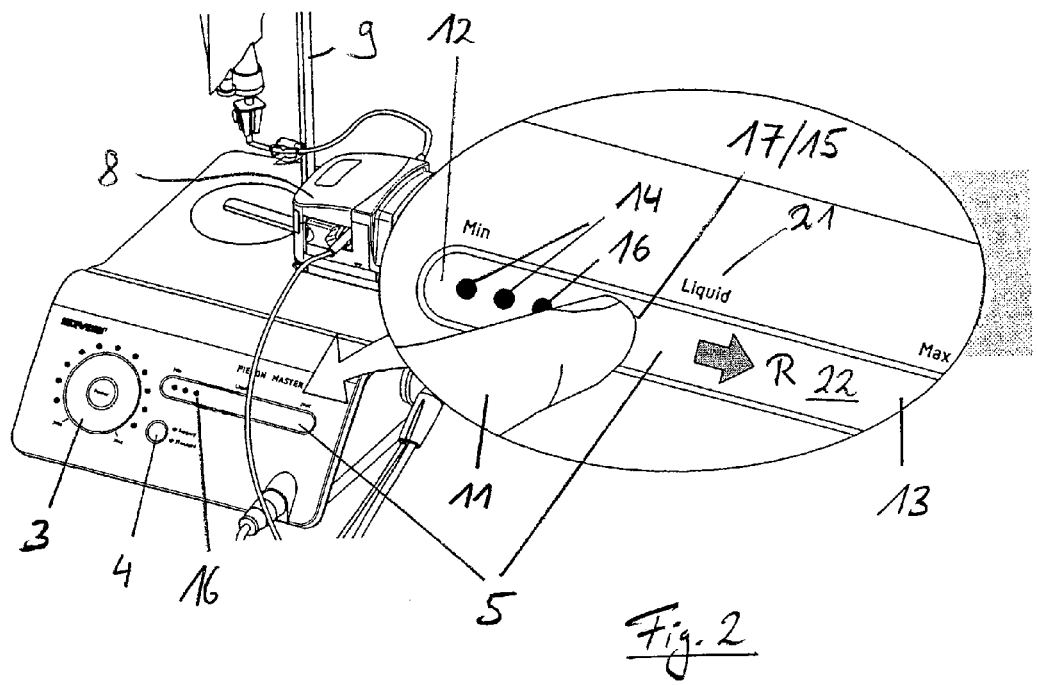
Figure 3:
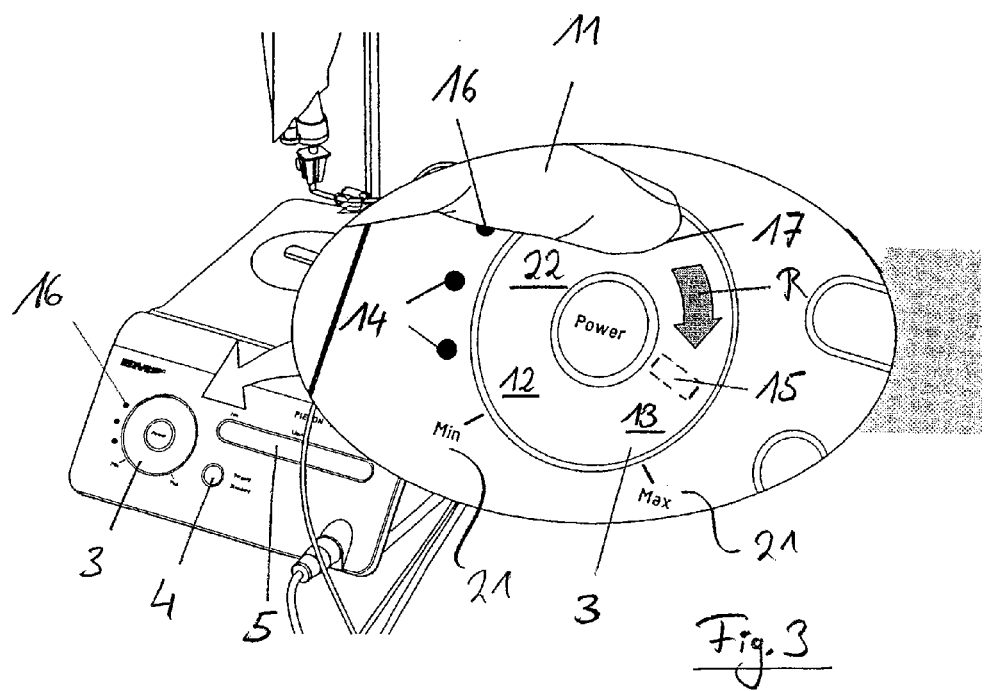

An advantageous embodiment of the present invention is explained more fully by means of the attached drawings. These show:

FIG. 1 a dental surgical apparatus having three operating elements according to the present invention, FIG. 1a a schematic section through an operating element according to the invention, FIG. 2 a schematic representation of a first preferred embodiment of the operating element according to the invention, and FIG. 3 a second preferred embodiment of the operating element according to the invention.

FIG. 1 shows a dental surgical apparatus 1 for the prophylactic treatment of teeth. For this, a metal tip located on a handset is excited piezoceramically to perform oscillations in order to remove damaging plaque from the tooth surface. To this end, via a connecting piece 6, electrical energy is supplied to activate the ultrasound handset 7, parallel thereto a special cooling fluid (FIG. 2) is made available in a bag on a stand 9 and is supplied to the handset 7 via a pump 8 by means of a suitable hose (FIG. 2). To control the ultrasound frequency, a first operating element 3 is located on the operating panel 2 and is rotationally symmetrical, i.e. circular in form. Furthermore, on the operating panel 2 is located a second operating element 4, which is formed as a dot and which is provided for example for switching over the third operating element 5, for the switching on and off of the apparatus 1, or for other functions. Finally, there is on the operating panel 2 a third, elongate operating element 5, which is for controlling the supply of liquid. Obviously other forms of operating panels are possible. However, all the operating panels 3, 4, 5 in FIG. 1a have in common contact sensors 19 which are shown schematically and which are fixed under a preferably dielectric cover 20 and have contacts 18 by means of which a contact value 17 can be selected, which gives an indication of the position of the operating means 11. Within the dielectric cover 20, markings 21 can be incorporated or applied which specify to the operator minimum or maximum values or values in between such as for example 1, 2, 3 . . . 10.

Finally, a foot switch 10 for example is used for switching the ultrasound apparatus or the function of the handset on and off.

FIG. 2 shows a first preferred embodiment of the present invention on an enlarged scale. A liquid container fixed to the stand 9 supplies liquid to the handset 7 via the pump 8, which is controllable via the third operating panel 5. As can be seen in FIG. 2, behind the operating element 5, next to the touch-sensitive sensors 19 (not shown), a display 14 is located, in this case light-emitting diodes, which starting from a minimum value 12 up to a maximum value 13 show a current value 16, which is a measure of the liquid supplied. By touching a value 15 to be set by means of an operating means 11, such as a human finger for example, by means of the sensors 19 located behind the operating element 5, a contact value 17 is generated, which causes the current value 16 to be varied.

FIG. 3 shows a further advantageous embodiment of a first operating element 3, which is circular. In this case, the display 14 is located next to the operating surface 22, which indicates the arrangement of the touch-sensitive sensors 19 (not shown). As FIG. 3 shows, the contact sensors 19, due to contact with a finger, generate a contact value 17, which causes the current value 16 to be changed. This change is effected in various embodiments:

As is shown in FIG. 2, by tapping the operating surface 22, a contact value 17 is generated, which results in immediate changing in the current value 16, which is set immediately to the contact value 17, which also simultaneously indicates the value 15 to be set. Alternatively, the current value 16 is varied continuously in the direction of the contact value 17 if the finger 11 is left on the operating surface 22 until either the current value 16 has reached the contact value 17 or until the finger is lifted again from the operating surface 22, whereby the current value 16 is then left at the point on which it is located at the moment of lifting of the finger.

Alternatively, as is shown in FIG. 3, the finger 11 can also be moved circularly along the operating surface 22 in the direction of the adjustment direction R, whereby parallel to the adjustment direction R also the current value 16 changes until this has reached the value 15 to be set. In this case represented physically, the finger 11 would then be located roughly on the position of the minimum value 12. It is therefore not necessary to place the finger 11 precisely on the point where the current value 16 is located.

The operating element of the current invention has, in addition to a surprisingly simple configuration, plural advantages which are necessary particularly in the field of medicine:

There are no electrical components on the operating surface. Since there are no mechanical parts to be moved, there is no wear of the control. The operating surface may have virtually any configuration and the software permits completely different control or functionality of the individual operating elements. Because of the smooth surface, this can be easily cleaned and disinfected. Operation is also easily possible with operating gloves, the desired settings are rapidly reached and are directly controllable according to the wishes of the doctor. Also relative changes can vary the current value, so that the doctor can effect a change at any position of the operating element. By way of one-finger operation, setting is also possible when holding an instrument in the hand. All settings are very easy to read.

Alternatively to the embodiments described above, it is also possible to depress the operating surface 22, i.e. to form it like a groove, in order to make it easier for the operator to reach the precise position of the touch-sensitive sensors 19, whereby the arrangement of the markings 21 is supported. To the same extent, it is possible to reverse the functionality of tapping or continuous contact of the operating surface 22, i.e. continuous adjustment of the current value 16 takes place by tapping (and is ended by tapping again), whilst continuous contact of the operating surface 22 for e.g. a minimum period of 0.5 seconds leads to immediate repositioning of the current value 16 to the contact value 17. Also, repositioning of the functionality of an operating element is possible e.g. by a double-click, i.e. by rapid consecutive tapping of the operating panel.

The invention claimed is:

1. Operating element for inputting values into a medical apparatus, having a touch-sensitive sensor and an operating surface, the sensor being mounted below a cover forming the operating surface,
    wherein the sensor detects the presence or absence of an operating means and generates a contact value in response thereto,
    characterized in that a display of the operating element displays a current value which may be changed, by means of the contact value generated by the sensor, to a value to be set;
    characterized in that the current value is set and displayed continuously or step-wise and is variable independently of a point of presence or absence of the operating means;
    characterized in that the touch-sensitive sensor is a capacitive sensor, which is mounted below a dielectric cover, and in that the sensor is responsive to a human finger;
    characterized in that in order to set the value to be set, the operating means can be placed and/or displaced to any position on the operating surface, wherein the setting can be an absolute setting, a relative setting and/or a dynamic setting; and
    wherein the at least one operating element has an operating surface in the form of a dot, a line or a circle, which is applied to an operating panel for inputting flow rates and/or flow strengths for medicaments or flushing liquids or for the input of other medicinal parameters.

2. Operating element according to claim 1, characterized in that the operating surface is in the form of a dot, a line or a circle.

3. Operating element according to claim 1, characterized in that the display displays the current value continuously even during setting and/or in that markings are provided on or next to the operating surface and indicate the values to be set.

4. Operating element according to claim 1, characterized in that the cover forming the operating surface is so formed and/or mounted that the transfer of moisture from the operating means to the sensor is not possible.

5. Method of inputting values into a medical apparatus, wherein a touch-sensitive sensor is mounted under a cover which forms an operating surface,
    wherein the sensor detects the presence or absence of an operating means and generates a contact value in response thereto,
    characterized in that a current value is displayed and may be changed, by means of the contact value generated by the sensor, to a value to be set;
    characterized in that the current value is set and displayed continuously or step-wise and is variable independently of a point of presence or absence of the operating means;
    characterized in that the touch-sensitive sensor is a capacitive sensor, which is mounted below a dielectric cover, and in that the sensor is responsive to a human finger;
    characterized in that in order to set the value to be set, the operating means can be placed and/or displaced to any position on the operating surface, wherein the setting can be an absolute setting a relative setting and/or a dynamic setting; and
    wherein the at least one operating element has an operating surface in the form of a dot, a line or a circle, which is applied to an operating panel for inputting flow rates and/or flow strengths for medicaments or flushing liquids or for the input of other medicinal parameters.

6. Method according to claim 5, characterized in that the contact value is generated by tapping or touching the value to be set on the operating surface and the current value is set immediately to the value to be set.

7. Method according to claim 5, characterized in that the current value is varied continuously by touching the operating surface at any point in the direction of the contact value, until the current value has reached the contact value or until the contact value is reset by absence of the operating means.

8. Method according to claim 5, characterized in that the current value is varied continuously by brushing the operating means over the operating surface in an adjustment direction until the contact value is reset by absence of the operating means.

9. Method according to claim 8, characterized in that upon acceleration of the brushing movement of the operating means, the rate of change of the current value is varied.

10. Dental apparatus with an operating panel having at least three operating elements, each of said operating elements having a touch-sensitive sensor and an operating surface in the form of a dot, a line or a circle, and being applied to an operating panel for inputting flow rates and/or flow strength for medicament or flushing liquids or for the input of other medicinal parameters, the sensor being mounted below a cover forming the operating surface, wherein the sensor detects the presence or absence of an operating means and generates a contact value in response thereto, wherein the touch-sensitive sensor is a capacitive sensor, which is mounted below a dielectric cover, and the sensor is responsive to a human finger, wherein a display of the operating element displays a current value which may be varied, be means of the contact value generated by the sensor, to a value to be set;

characterized in that the current value is set and displayed continuously or step-wise and is variable independently of a point of presence or absence of the operating means;

characterized in that in order to set the value to be set, the operating means can be placed and/or displaced to any position on the operating surface, wherein the setting can be an absolute setting a relative setting and/or a dynamic setting; and wherein the at least one operating element has an operating surface in the form of a dot, a line or a circle, which is applied to an operating panel for inputting flow rates and/or flow strengths for medicaments or flushing liquids or for the input of other medicinal parameters.

11. Dental apparatus according to claim 10, characterized in that the operating panel forms a closed, water-tight surface, in which the operating surfaces are formed by depressions.

* * * * *